US012610289B2

(12) United States Patent
Shi et al.

(10) Patent No.: US 12,610,289 B2
(45) Date of Patent: Apr. 21, 2026

(54) HANDLING QoS UPDATING DURING Xn HANDOVER

(71) Applicant: Telefonaktiebolaget LM Ericsson (publ), Stockholm (SE)

(72) Inventors: Nianshan Shi, Järfälla (SE); Qian Chen, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 372 days.

(21) Appl. No.: 18/248,898

(22) PCT Filed: Oct. 14, 2021

(86) PCT No.: PCT/IB2021/059460
§ 371 (c)(1),
(2) Date: Apr. 13, 2023

(87) PCT Pub. No.: WO2022/079659
PCT Pub. Date: Apr. 21, 2022

(65) Prior Publication Data
US 2023/0422107 A1     Dec. 28, 2023

Related U.S. Application Data

(60) Provisional application No. 63/091,665, filed on Oct. 14, 2020.

(51) Int. Cl.
*H04W 36/00*         (2009.01)
*H04W 36/14*         (2009.01)

(52) U.S. Cl.
CPC ....... *H04W 36/0044* (2013.01); *H04W 36/14* (2013.01)

(58) Field of Classification Search
CPC ......................... H04W 36/0044; H04W 36/14; H04W 36/005
See application file for complete search history.

(56) References Cited

U.S. PATENT DOCUMENTS

| | | | |
|---|---|---|---|
| 11,356,888 B2 * | 6/2022 | Li | ......................... H04W 40/24 |
| 2020/0112907 A1 * | 4/2020 | Dao | .................. H04M 15/8016 |

(Continued)

FOREIGN PATENT DOCUMENTS

WO       2019/098913 A1     5/2019

OTHER PUBLICATIONS

International Search Report and Written Opinion dated Feb. 3, 2022 issued in PCT Application No. PCT/IB2021/059460 filed Oct. 14, 2021, consisting of 16 pages.

(Continued)

*Primary Examiner* — Kibrom T Hailu
(74) *Attorney, Agent, or Firm* — Sonoda & Kobayashi Intellectual Property Law; Darren M. Gardner

(57)         ABSTRACT

A method, system and apparatus are disclosed for handling Quality-of-Service (QoS) updating during handover (HO). In one embodiment, a network node is configured to during a handover, HO, procedure associated with a wireless device, WD, receive a path switch request acknowledgement message comprising at least one first Quality-of-Service, QoS, parameter value associated with the WD; and as a result of the received path switch request acknowledgement message comprising the at least one first QoS parameter value, use at least one second QoS parameter value associated with the WD and send a notification, the notification indicating at least one of: that the at least one first QoS parameter value is not fulfilled, that a QoS parameter updating is not supported by the network node and that the QoS parameter updating failed.

21 Claims, 8 Drawing Sheets

(56) References Cited

U.S. PATENT DOCUMENTS

2020/0229059 A1 *  7/2020  Xu .................... H04W 36/0044
2022/0060901 A1 *  2/2022  Rajendran ............. H04W 24/10

OTHER PUBLICATIONS

3GPP TSG-RAN WG3 Meeting #110e; R3-206602; Agenda Item:
8.1; Source: Ericsson; Title: QoS Parameters Update at Xn Handover;
Document for: Discussion and Approval; Online Meeting, Nov.
2-12, 2020, consisting of 2 pages.
3GPP TSG-RAN WG3 Meeting #110e; R3-206603; Change Request
38.413 CR 0158 Rev—Current Version: 16.3.0; Title: QoS Param-
eters Update at Xn Handover; Source to WG: Ericsson; Source to
TSG: R3; Online Nov. 2-12, 2020, consisting of 12 pages.
3GPP TSG-RAN3 Meeting #108-e; R3-203662; Title: (TP for
NR_IIoT BL CR for TS 38.413): Introducing Updated QoS Param-
eters in Path Switch Request Knowledge; Source: Huawei; Agenda
Item: 17.2.4.2; Document Type: Other; E-meeting Jun. 1-11, 2020,
consisting of 12 pages.
3GPP TSG-SA2 Meeting #140E; S-2 2005858; Change Request
23.502 CR Rev. Current Version: 16.5.1; Online, Aug. 19-Sep. 2,
2020, consisting of 6 pages.

* cited by examiner

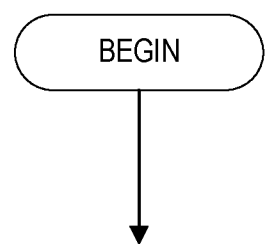

BEGIN

During a handover (HO) procedure associated with the WD, receive a path switch request acknowledgement message comprising at least one first Quality-of-Service (QoS) parameter value associated with the WD
S134

As a result of the received path switch request acknowledgement message comprising the at least one first QoS parameter value, use at least one second QoS parameter value associated with the WD and/or send a notification, the notification indicating at least one of: that the at least one first QoS parameter value is not fulfilled, that QoS parameter updating is not supported, that QoS parameter updating failed and a release of a QoS flow
S136

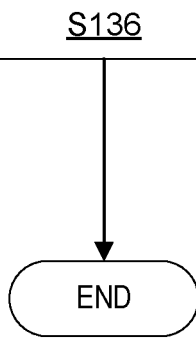

END

FIG. 7

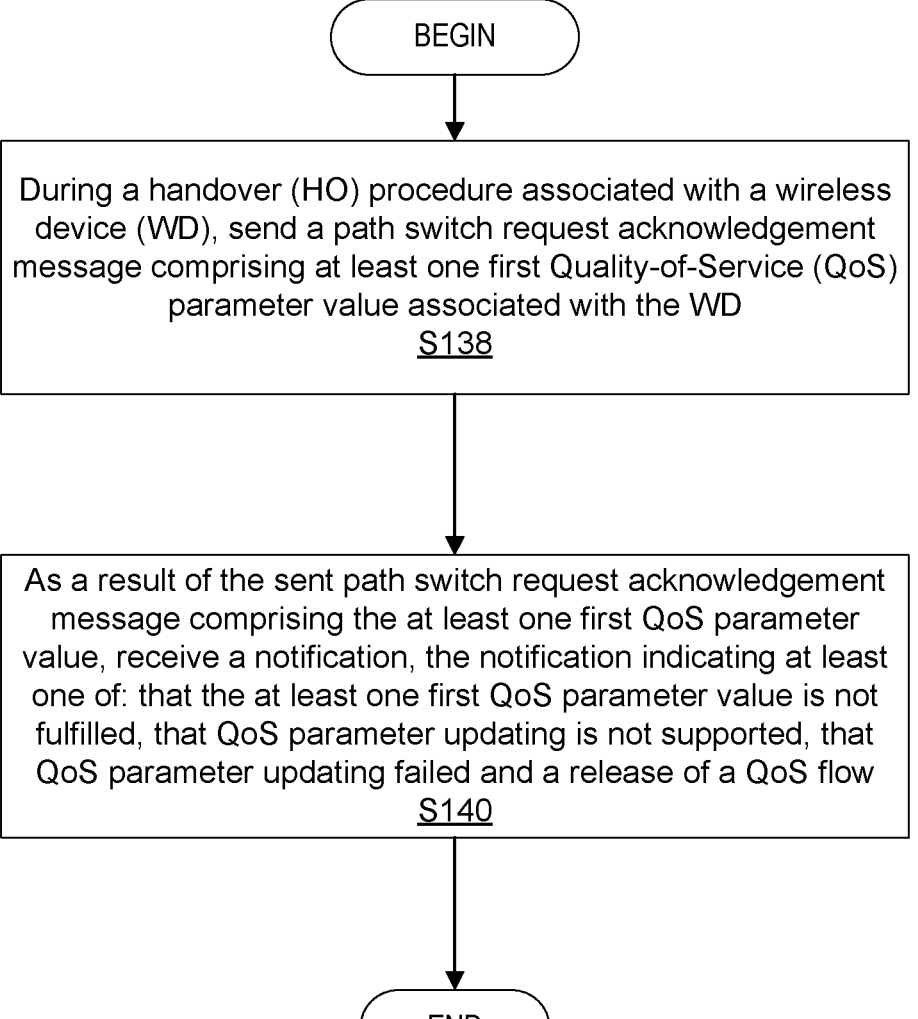

BEGIN

During a handover (HO) procedure associated with a wireless device (WD), send a path switch request acknowledgement message comprising at least one first Quality-of-Service (QoS) parameter value associated with the WD
S138

As a result of the sent path switch request acknowledgement message comprising the at least one first QoS parameter value, receive a notification, the notification indicating at least one of: that the at least one first QoS parameter value is not fulfilled, that QoS parameter updating is not supported, that QoS parameter updating failed and a release of a QoS flow
S140

END

FIG. 8

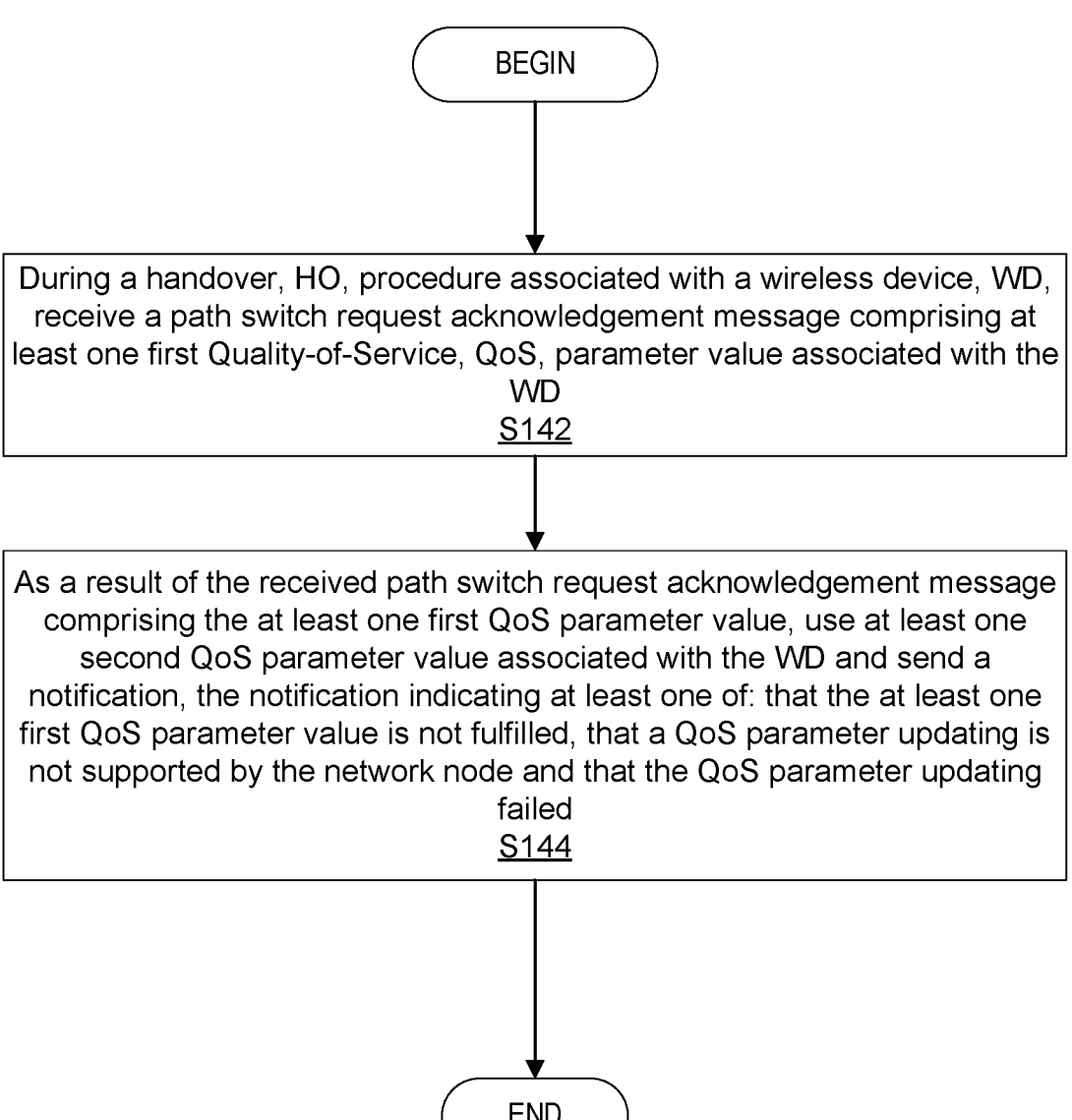

BEGIN

During a handover, HO, procedure associated with a wireless device, WD, receive a path switch request acknowledgement message comprising at least one first Quality-of-Service, QoS, parameter value associated with the WD
S142

As a result of the received path switch request acknowledgement message comprising the at least one first QoS parameter value, use at least one second QoS parameter value associated with the WD and send a notification, the notification indicating at least one of: that the at least one first QoS parameter value is not fulfilled, that a QoS parameter updating is not supported by the network node and that the QoS parameter updating failed
S144

END

FIG. 9

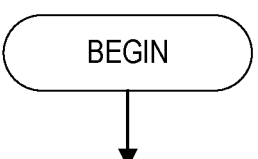

BEGIN

During a handover, HO, procedure associated with a wireless device, WD, sending, to a second network node, a path switch request acknowledgement message comprising at least one first Quality-of-Service, QoS, parameter value associated with the WD
S146

As a result of the sent path switch request acknowledgement message comprising the at least one first QoS parameter value, receive, from the second network node, a notification, the notification indicating at least one of: that the at least one first QoS parameter value is not fulfilled, that a QoS parameter updating is not supported by the second network node and that the QoS parameter updating failed
S148

As a result of the notification, determine that the second network node is using at least one second QoS parameter value, the at least one second QoS parameter value being different from the at least one first QoS parameter value
S150

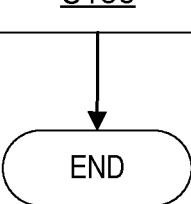

END

FIG. 10

HANDLING QoS UPDATING DURING Xn HANDOVER

CROSS-REFERENCE TO RELATED APPLICATIONS

This application is a Submission Under 35 U.S.C. § 371 for U.S. National Stage Patent Application of International Application No.: PCT/IB2021/059460, filed Oct. 14, 2021 entitled "HANDLING QoS UPDATING DURING XN HANDOVER," which claims priority to U.S. Provisional Application No. 63/091,665, filed Oct. 14, 2020, entitled "HANDLING QoS UPDATING DURING XN HANDOVER," the entireties of both of which are incorporated herein by reference.

FIELD

The present disclosure relates to wireless communications, and in particular, to handling a Quality-of-Service (QoS) updating during handover (HO).

BACKGROUND

The $3^{rd}$ Generation Partnership Project (3GPP) has considered the handling of QoS during Xn HO (or X2 HO in 3GPP Evolved Packet System, or EPS). The logic is that during Xn HO, the QoS parameters remains unchanged. The change can happen in the user plane tunnel information at the radio access network (RAN) side and also possibly the user plane tunnel information at the core network (CN) side.

If any QoS parameter updates/modifications are needed, the CN can trigger a separate protocol data unit (PDU) session modification procedure to enforce the update after the handover.

The current Next Generation-Radio Access Network (NG-RAN) Application Protocol (NGAP) messages handling Xn HO (e.g., Path Switch Request/Path Switch Request Acknowledgement) are designed in this way. As such, there currently are no QoS parameters in the messages.

SUMMARY

Some embodiments advantageously provide methods, systems, and apparatuses for handling Quality-of-Service (QoS) updating during handover (HO).

According to an aspect, a network node is configured to during a handover (HO) procedure associated with the WD, receive a path switch request acknowledgement message comprising at least one first Quality-of-Service (QoS) parameter value associated with the WD; and as a result of the received path switch request acknowledgement message comprising the at least one first QoS parameter value, use at least one second QoS parameter value associated with the WD and/or send a notification, the notification indicating at least one of: that the at least one first QoS parameter value is not fulfilled, that QoS parameter updating is not supported, that QoS parameter updating failed and a release of a QoS flow.

According to another aspect, a network node is configured to during a handover (HO) procedure associated with a wireless device (WD), send a path switch request acknowledgement message comprising at least one first Quality-of-Service (QoS) parameter value associated with the WD; and as a result of the sent path switch request acknowledgement message comprising the at least one first QoS parameter value, receive a notification, the notification indicating at least one of: that the at least one first QoS parameter value is not fulfilled, that QoS parameter updating is not supported, that QoS parameter updating failed and a release of a QoS flow.

According to another aspect of the present disclosure, a method implemented in a network node is provided. The method includes during a handover, HO, procedure associated with a wireless device, WD, receiving a path switch request acknowledgement message comprising at least one first Quality-of-Service, QoS, parameter value associated with the WD; and as a result of the received path switch request acknowledgement message comprising the at least one first QoS parameter value, using at least one second QoS parameter value associated with the WD and sending a notification, the notification indicating at least one of: that the at least one first QoS parameter value is not fulfilled, that a QoS parameter updating is not supported by the network node and that the QoS parameter updating failed.

In some embodiments of this aspect, the at least one first QoS parameter value represents an updated QoS parameter value associated with the WD. In some embodiments of this aspect, at least one first and second QoS parameter values are core network, CN, packet delay budget, PDB, parameter values. In some embodiments of this aspect, the notification is comprised in a protocol data unit, PDU, session resource notify message. In some embodiments of this aspect, the second QoS parameter value is stored at the network node for the WD, before the receiving the path switch request acknowledgement message comprising the at least one first QoS parameter value.

In some embodiments of this aspect, the notification indicates the at least one third QoS parameter value and the at least one third QoS parameter value comprises at least one QoS parameter value that the network node is able to fulfill. In some embodiments of this aspect, the notification comprises the at least one third QoS parameter value and the at least one third QoS parameter value comprises at least one proposed CN PDB parameter value. In some embodiments of this aspect, the notification further comprises information indicating a cause for the notification. In some embodiments of this aspect, the cause indicated in the notification includes at least one of: that the at least one first QoS parameter value is not fulfilled, that the QoS updating is not supported by the network node and that the QoS parameter updating failed.

In some embodiments of this aspect, the method further includes sending a path switch request message to a core network node, the received path switch request acknowledgement message being a response from the core network node to the path switch request message and the path switch request message representing a request to HO the WD from a first radio access network to a second radio access network. In some embodiments of this aspect, the network node comprises a radio access network, RAN, node and the core network node comprises an access and mobility management, AMF, function.

According to yet another aspect of the present disclosure, a method implemented in a network node is provided. The method includes during a handover, HO, procedure associated with a wireless device, WD, sending, to a second network node, a path switch request acknowledgement message comprising at least one first Quality-of-Service, QoS, parameter value associated with the WD; as a result of the sent path switch request acknowledgement message comprising the at least one first QoS parameter value, receiving, from the second network node, a notification, the notification indicating at least one of: that the at least one first QoS parameter value is not fulfilled, that a QoS parameter updating is not supported by the second network node and that the QoS parameter updating failed; and as a result of the notification, determining that the second network node is using at least one second QoS parameter value, the at least one second QoS parameter value being different from the at least one first QoS parameter value.

In some embodiments of this aspect, the at least one first QoS parameter value represents an updated QoS parameter value associated with the WD. In some embodiments of this aspect, at least one first and second QoS parameter values are core network, CN, packet delay budget, PDB, parameter values. In some embodiments of this aspect, the notification is comprised in a protocol data unit, PDU, session resource notify message. In some embodiments of this aspect, the second QoS parameter value is stored at the second network node for the WD, before the sending the path switch request acknowledgement message comprising the at least one first QoS parameter value. In some embodiments of this aspect, the notification indicates the at least one third QoS parameter value and the at least one third QoS parameter value comprises at least one QoS parameter value that the second network node is able to fulfill.

In some embodiments of this aspect, the notification comprises the at least one third QoS parameter value and the at least one third QoS parameter value comprises at least one proposed CN PDB parameter value. In some embodiments of this aspect, the notification further comprises information indicating a cause for the notification. In some embodiments of this aspect, the cause indicated in the notification includes at least one of: that the at least one first QoS parameter value is not fulfilled, that the QoS updating is not supported by the network node and that the QoS parameter updating failed.

In some embodiments of this aspect, the method further includes receiving a path switch request message from the second network node, the sent path switch request acknowledgement message being a response to the radio access network node to the path switch request message and the path switch request message representing a request to HO the WD from a first radio access network to a second radio access network supported by the second network node. In some embodiments of this aspect, the second network node comprises a radio access network, RAN, node and the network node comprises an access and mobility management, AMF, function.

According to yet another aspect of the present disclosure, a network node comprising processing circuitry is provided. The processing circuitry is configured to cause the network node to during a handover, HO, procedure associated with a wireless device, WD, receive a path switch request acknowledgement message comprising at least one first Quality-of-Service, QoS, parameter value associated with the WD; and as a result of the received path switch request acknowledgement message comprising the at least one first QoS parameter value, use at least one second QoS parameter value associated with the WD and send a notification, the notification indicating at least one of: that the at least one first QoS parameter value is not fulfilled, that a QoS parameter updating is not supported by the network node and that the QoS parameter updating failed.

In some embodiments of this aspect, the at least one first QoS parameter value represents an updated QoS parameter value associated with the WD. In some embodiments of this aspect, the at least one first and second QoS parameter values are core network, CN, packet delay budget, PDB, parameter values. In some embodiments of this aspect, the notification is comprised in a protocol data unit, PDU, session resource notify message. In some embodiments of this aspect, the second QoS parameter value is stored at the network node for the WD, before the receiving the path switch request acknowledgement message comprising the at least one first QoS parameter value.

In some embodiments of this aspect, the notification indicates the at least one third QoS parameter value and the at least one third QoS parameter value comprises at least one QoS parameter value that the network node is able to fulfill. In some embodiments of this aspect, the notification comprises the at least one third QoS parameter value and the at least one third QoS parameter value comprises at least one proposed CN PDB parameter value. In some embodiments of this aspect, the notification further comprises information indicating a cause for the notification. In some embodiments of this aspect, the cause indicated in the notification includes at least one of: that the at least one first QoS parameter value is not fulfilled, that the QoS updating is not supported by the network node and that the QoS parameter updating failed.

In some embodiments of this aspect, the processing circuitry is configured to cause the network node to send a path switch request message to a core network node, the received path switch request acknowledgement message being a response from the core network node to the path switch request message and the path switch request message representing a request to HO the WD from a first radio access network to a second radio access network. In some embodiments of this aspect, the network node comprises a radio access network, RAN, node and the core network node comprises an access and mobility management, AMF, function.

According to yet another aspect of the present disclosure, a network node comprising processing circuitry is provided. The processing circuitry is configured to cause the network node to during a handover, HO, procedure associated with a wireless device, WD, sending, to a second network node, a path switch request acknowledgement message comprising at least one first Quality-of-Service, QoS, parameter value associated with the WD; as a result of the sent path switch request acknowledgement message comprising the at least one first QoS parameter value, receiving, from the second network node, a notification, the notification indicating at least one of: that the at least one first QoS parameter value is not fulfilled, that a QoS parameter updating is not supported by the second network node and that the QoS parameter updating failed; and as a result of the notification, determining that the second network node is using at least one second QoS parameter value, the at least one second QoS parameter value being different from the at least one first QoS parameter value.

In some embodiments of this aspect, the at least one first QoS parameter value represents an updated QoS parameter value associated with the WD. In some embodiments of this aspect, the at least one first and second QoS parameter values are core network, CN, packet delay budget, PDB, parameter values. In some embodiments of this aspect, the notification is comprised in a protocol data unit, PDU, session resource notify message. In some embodiments of this aspect, the second QoS parameter value is stored at the second network node for the WD, before the sending the path switch request acknowledgement message comprising the at least one first QoS parameter value. In some embodiments of this aspect, the notification indicates the at least one third QoS parameter value and the at least one third QoS parameter value comprises at least one QoS parameter value that the second network node is able to fulfill.

In some embodiments of this aspect, the notification comprises the at least one third QoS parameter value and the at least one third QoS parameter value comprises at least one proposed CN PDB parameter value. In some embodiments of this aspect, the notification further comprises information indicating a cause for the notification. In some embodiments of this aspect, the cause indicated in the notification includes at least one of: that the at least one first QoS parameter value is not fulfilled, that the QoS updating is not supported by the network node and that the QoS parameter updating failed.

In some embodiments of this aspect, the processing circuitry is configured to cause the network node to receive a path switch request message from the second network node, the sent path switch request acknowledgement message being a response to the radio access network node to the path switch request message and the path switch request message representing a request to HO the WD from a first radio access network to a second radio access network supported by the second network node. In some embodiments of this aspect, the second network node comprises a radio access network, RAN, node and the network node comprises an access and mobility management, AMF, function.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart of an example process in a first network node (e.g., RAN node) according to some embodiments of the present disclosure;

FIG. 8 is a flowchart of an example process in a second network node (e.g., AMF) according to some embodiments of the present disclosure;

FIG. 9 is a flowchart of another example process in a first network node (e.g., RAN node) according to some embodiments of the present disclosure; and

6

Figure 1:
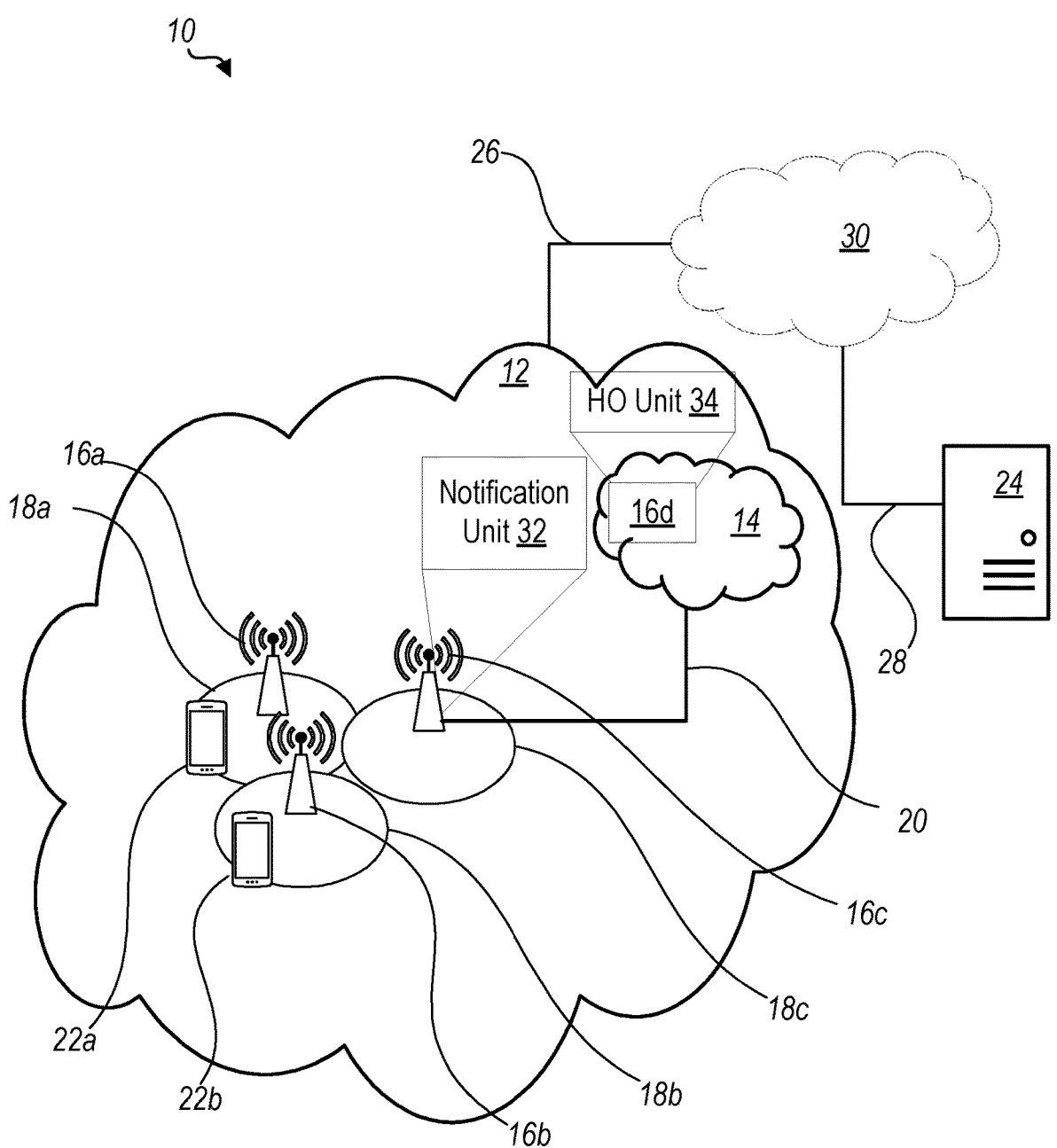
FIG. 1 is a schematic diagram of an example network architecture illustrating a communication system connected via an intermediate network to a host computer according to the principles in the present disclosure.

FIG. 10 is a flowchart of another example process in a second network node (e.g., AMF) according to some embodiments of the present disclosure.

DETAILED DESCRIPTION

Ultra Reliable and Low Latency Communication (URLLC) is supported in the 3GPP Stage 2 technical specifications (TSs) (e.g., 3GPP TS 23.501 and 23.502). This TS indicates that, during the Xn HO procedure, the QoS parameter (e.g., the CN PDB, Core Network Packet Delay Budget) can be updated as part of the Xn HO procedure, e.g., in the Path Switch Request Acknowledgement message.

This may result in a fundamental impact on Xn HO related NGAP messages, e.g., Path Switch procedure. This also introduces a more complicated handling in the RAN node as compared with updating in other ways. Considering the CN PDB change during Xn HO is a debatable issue and the QoS parameters' update in a Xn HO NGAP message may only be considered as one alternative, but not the only alternative.

Cases where a radio network is deployed with mixed RAN nodes, e.g., RAN nodes supporting or non-supporting of QoS parameters in Xn HO NGAP messages, may result in inconsistent issues if the core network provides QoS parameters to a non-supporting RAN node in a Xn HO NGAP message.

Some embodiments of the present disclosure provide solutions for handling a non-supporting NG-RAN node receiving QoS parameters updated during the Xn Handover procedure.

Some embodiments of the present disclosure provide arrangements for handling the QoS updating in an Xn Handover procedure in the non-supporting NG-RAN node. Before describing in detail example embodiments, it is noted that the embodiments reside primarily in combinations of apparatus components and processing steps related to handling a Quality-of-Service (QoS) updating during handover (HO). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical sig-
naling, for example. One having ordinary skill in the art will
appreciate that multiple components may interoperate and
modifications and variations are possible of achieving the
electrical and data communication.

In some embodiments described herein, the term
"coupled," "connected," and the like, may be used herein to
indicate a connection, although not necessarily directly, and
may include wired and/or wireless connections.

The term "network node" used herein can be any kind of
network node comprised in a radio network which may
further comprise any of base station (BS), radio base station,
base transceiver station (BTS), base station controller
(BSC), radio network controller (RNC), g Node B (gNB),
evolved Node B (eNB or eNodeB), Node B, multi-standard
radio (MSR) radio node such as MSR BS, multi-cell/
multicast coordination entity (MCE), integrated access and
backhaul (IAB) node, relay node, donor node controlling
relay, radio access point (AP), transmission points, trans-
mission nodes, Remote Radio Unit (RRU) Remote Radio
Head (RRH), a core network node (e.g., mobile management
entity (MME), self-organizing network (SON) node, a coor-
dinating node, positioning node, MDT node, etc.), an exter-
nal node (e.g., 3rd party node, a node external to the current
network), nodes in distributed antenna system (DAS), a
spectrum access system (SAS) node, an element manage-
ment system (EMS), etc. The network node may also
comprise test equipment. The term "radio node" used herein
may be used to also denote a wireless device (WD) such as
a wireless device (WD) or a radio network node.

In some embodiments, the non-limiting terms wireless
device (WD) or a user equipment (UE) are used interchange-
ably. The WD herein can be any type of wireless device
capable of communicating with a network node or another
WD over radio signals, such as wireless device (WD). The
WD may also be a radio communication device, target
device, device to device (D2D) WD, machine type WD or
WD capable of machine to machine communication (M2M),
low-cost and/or low-complexity WD, a sensor equipped
with WD, Tablet, mobile terminals, smart phone, laptop
embedded equipped (LEE), laptop mounted equipment
(LME), USB dongles, Customer Premises Equipment
(CPE), an Internet of Things (IoT) device, or a Narrowband
IoT (NB-IOT) device, etc.

Also, in some embodiments the generic term "radio
network node" is used. It can be any kind of a radio network
node which may comprise any of base station, radio base
station, base transceiver station, base station controller,
network controller, RNC, evolved Node B (eNB), Node B,
gNB, Multi-cell/multicast Coordination Entity (MCE), IAB
node, relay node, access point, radio access point, Remote
Radio Unit (RRU) Remote Radio Head (RRH).

An indication generally may explicitly and/or implicitly
indicate the information it represents and/or indicates.
Implicit indication may for example be based on position
and/or resource used for transmission. Explicit indication
may for example be based on a parametrization with one or
more parameters, and/or one or more index or indices
corresponding to a table, and/or one or more bit patterns
representing the information.

Note that although terminology from one particular wire-
less system, such as, for example, 3GPP LTE and/or New
Radio (NR), may be used in this disclosure, this should not
be seen as limiting the scope of the disclosure to only the
aforementioned system. Other wireless systems, including
without limitation Wide Band Code Division Multiple
Access (WCDMA), Worldwide Interoperability for Microwave Access (WiMax), Ultra Mobile Broadband (UMB) and
Global System for Mobile Communications (GSM), may
also benefit from exploiting the ideas covered within this
disclosure.

Note further, that functions described herein as being
performed by a wireless device or a network node may be
distributed over a plurality of wireless devices and/or net-
work nodes. In other words, it is contemplated that the
functions of the network node and wireless device described
herein are not limited to performance by a single physical
device and, in fact, can be distributed among several physi-
cal devices.

Unless otherwise defined, all terms (including technical
and scientific terms) used herein have the same meaning as
commonly understood by one of ordinary skill in the art to
which this disclosure belongs. It will be further understood
that terms used herein should be interpreted as having a
meaning that is consistent with their meaning in the context
of this specification and the relevant art and will not be
interpreted in an idealized or overly formal sense unless
expressly so defined herein.

Some embodiments provide arrangements for handling a
Quality-of-Service (QoS) updating during handover (HO).

Referring now to the drawing figures, in which like
elements are referred to by like reference numerals, there is
shown in FIG. 1 a schematic diagram of a communication
system 10, according to an embodiment, such as a 3GPP-
type cellular network that may support standards such as
LTE and/or NR (5G), which comprises an access network
12, such as a radio access network, and a core network 14.
The access network 12 comprises a plurality of network
nodes 16a, 16b, 16c (referred to collectively as network
nodes 16), such as NBs, eNBs, gNBs or other types of
wireless access points, each defining a corresponding cov-
erage area 18a, 18b, 18c (referred to collectively as coverage
areas 18). The system 10 further includes network node 16d,
which may be a core network node, such as an access and
mobility management node (e.g., AMF). Each network node
16a, 16b, 16c is connectable to the core network 14 over a
wired or wireless connection 20. A first wireless device
(WD) 22a located in coverage area 18a is configured to
wirelessly connect to, or be paged by, the corresponding
network node 16a. A second WD 22b in coverage area 18b
is wirelessly connectable to the corresponding network node
16b. While a plurality of WDs 22a, 22b (collectively
referred to as wireless devices 22) are illustrated in this
example, the disclosed embodiments are equally applicable
to a situation where a sole WD is in the coverage area or
where a sole WD is connecting to the corresponding network
node 16. Note that although only two WDs 22 and three
network nodes 16 are shown for convenience, the commu-
nication system may include many more WDs 22 and
network nodes 16.

Also, it is contemplated that a WD 22 can be in simul-
taneous communication and/or configured to separately
communicate with more than one network node 16 and more
than one type of network node 16. For example, a WD 22
can have dual connectivity with a network node 16 that
supports LTE and the same or a different network node 16
that supports NR. As an example, WD 22 can be in com-
munication with an eNB for LTE/E-UTRAN and a gNB for
NR/NG-RAN.

The communication system 10 may itself be connected to
a host computer 24, which may be embodied in the hardware
and/or software of a standalone server, a cloud-implemented
server, a distributed server or as processing resources in a
server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16c is configured to include a notification unit 32 which is configured to during a handover (HO) procedure associated with the WD, receive a path switch request acknowledgement message comprising at least one first Quality-of-Service (QoS) parameter value associated with the WD; and as a result of the received path switch request acknowledgement message comprising the at least one first QoS parameter value, use at least one second QoS parameter value associated with the WD and/or send a notification, the notification indicating at least one of: that the at least one first QoS parameter value is not fulfilled, that QoS parameter updating is not supported, that QoS parameter updating failed and a release of a QoS flow.

A network node 16d is configured to include a HO unit 34 which is configured to during a handover (HO) procedure associated with a wireless device (WD), send a path switch request acknowledgement message comprising at least one first Quality-of-Service (QoS) parameter value associated with the WD; and as a result of the sent path switch request acknowledgement message comprising the at least one first QoS parameter value, receive a notification, the notification indicating at least one of: that the at least one first QoS parameter value is not fulfilled, that QoS parameter updating is not supported, that QoS parameter updating failed and a release of a QoS flow.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor and/or processing circuitry 68 to perform the processes described herein with respect to network node 16. For example, processing circuitry 68 of the network node 16 (e.g., RAN node/base station) may include notification unit 32 configured to perform network node methods discussed herein, such as the methods discussed with reference to FIG. 7 as well as other figures.

In some embodiments, processing circuitry 68 of the network node 16 (e.g., mobility management node such as AMF) may include HO unit 34 configured to perform network node methods discussed herein, such as the methods discussed with reference to FIG. 8 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
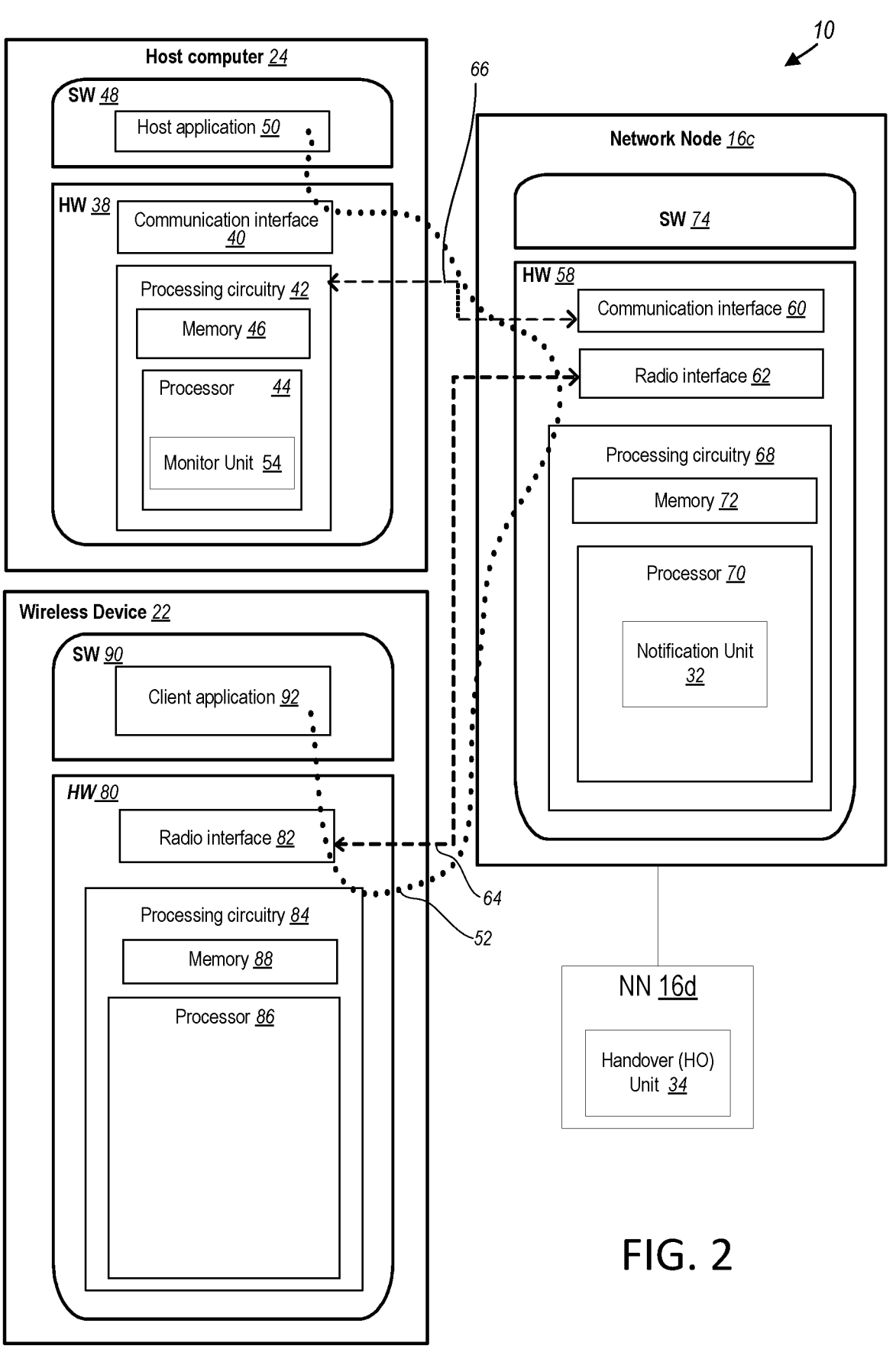
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as notification unit 32, and HO unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
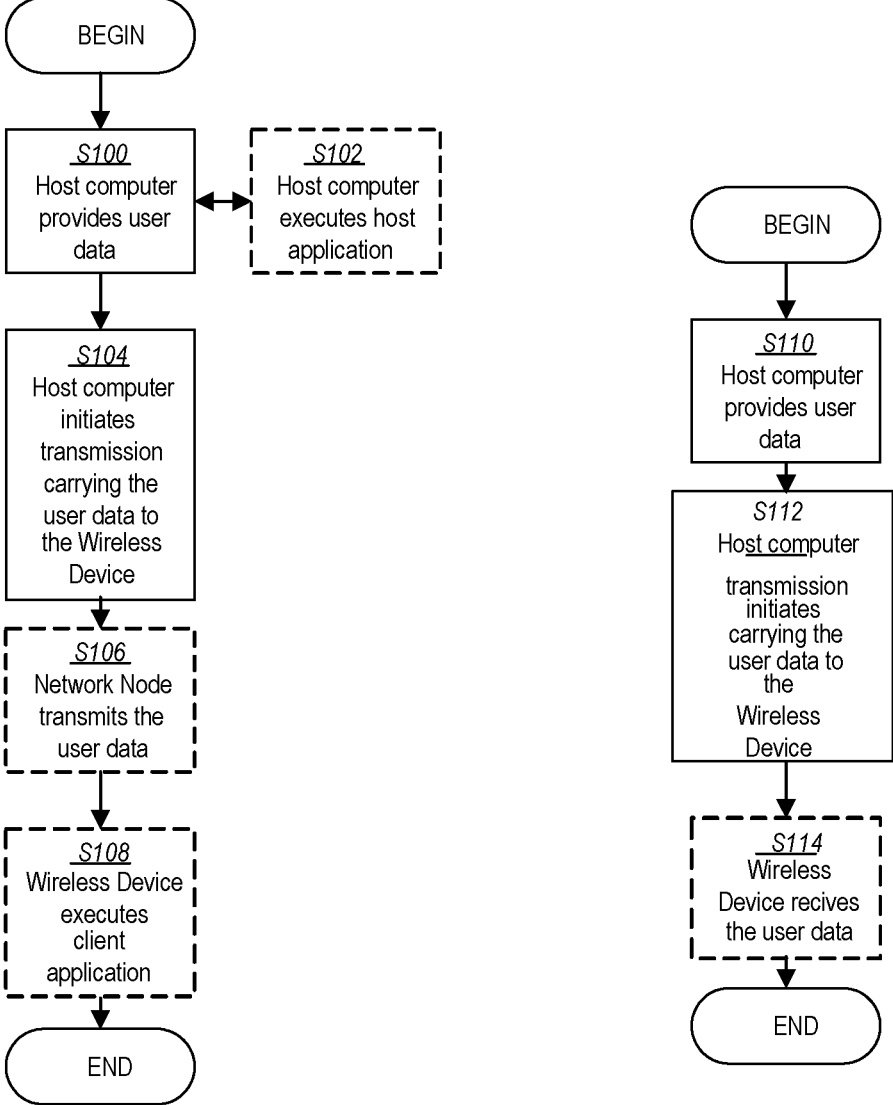
FIG. 3 is a flowchart illustrating example methods implemented in a communication system including a host computer, a network node and a wireless device for executing a client application at a wireless device according to some embodiments of the present disclosure.
FIG. 4 is a flowchart illustrating example methods implemented in a communication system including a host computer, a network node and a wireless device for receiving user data at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
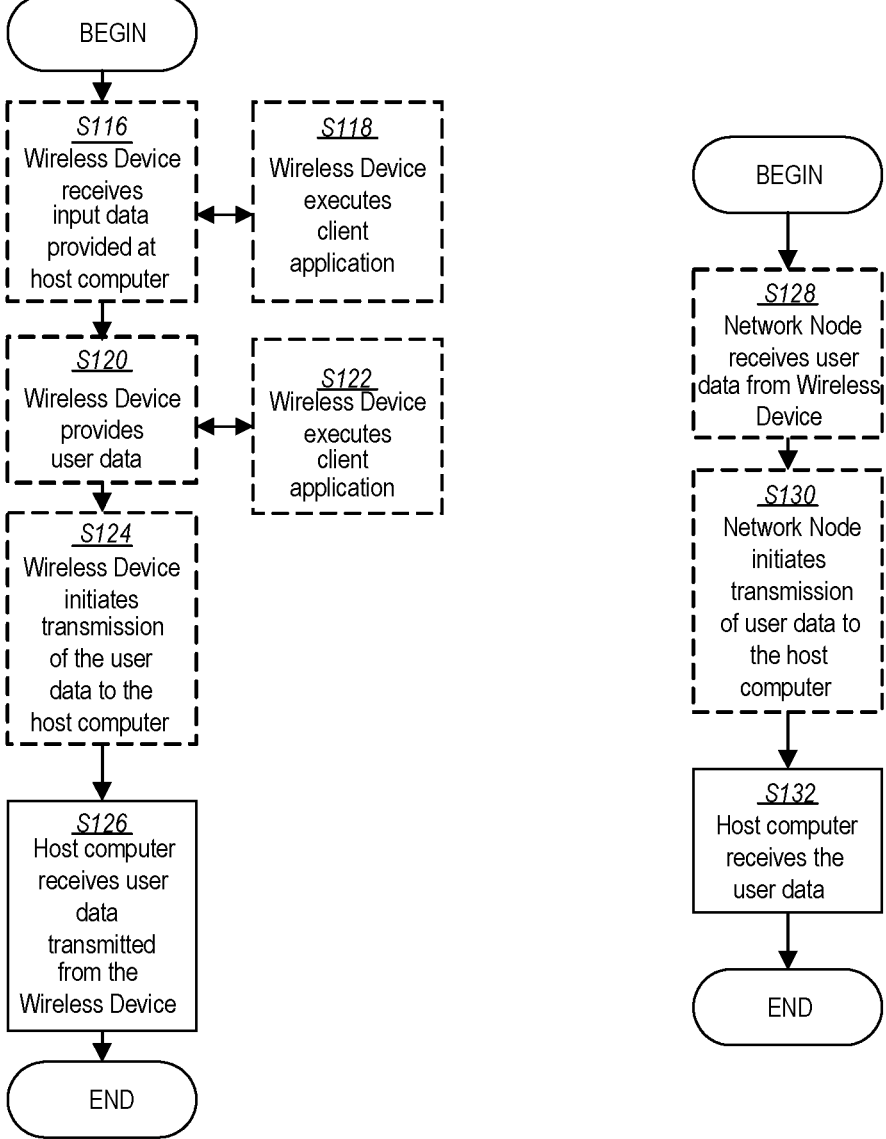
FIG. 5 is a flowchart illustrating example methods implemented in a communication system including a host computer, a network node and a wireless device for receiving user data from the wireless device at a host computer according to some embodiments of the present disclosure.
FIG. 6 is a flowchart illustrating example methods implemented in a communication system including a host computer, a network node and a wireless device for receiving user data at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 7 is a flowchart of an example process in a network node 16 (e.g., RAN node/base station node) according to some embodiments of the present disclosure. One or more Blocks and/or functions and/or methods performed by the network node 16 may be performed by one or more elements of network node 16 such as by notification unit 32 in processing circuitry 68, processor 70, radio interface 62, etc. according to the example method. The example method includes during a handover (HO) procedure associated with the WD, receiving (Block S134), such as via notification unit 32, processing circuitry 68, processor 70 and/or radio interface 62, a path switch request acknowledgement message comprising at least one first Quality-of-Service (QoS) parameter value associated with the WD. The method includes as a result of the received path switch request acknowledgement message comprising the at least one first QoS parameter value, using (Block S136), such as via notification unit 32, processing circuitry 68, processor 70 and/or radio interface 62, at least one second QoS parameter value associated with the WD and/or sending a notification, the notification indicating at least one of: that the at least one first QoS parameter value is not fulfilled, that QoS parameter updating is not supported, that QoS parameter updating failed and a release of a QoS flow.

In some embodiments, one or more of: the second QoS parameter value is different from the first QoS parameter value; the second QoS parameter value is stored at the network node before receiving the message comprising the at least one first QoS parameter value; the at least one first QoS parameter value represents an updated QoS parameter value; the network node comprises a radio access network (RAN) node; the RAN node is not configured to support QoS parameter updating during HO; the at least one first and second QoS parameter values are core network (CN) packet delay budget (PDB) parameter values; the notification is comprised in a protocol data unit, PDU, session resource notify message; the notification is sent to a core network node; the core network node comprises an access and mobility management (AMF) function; the notification further comprises information indicating a cause for the notification; the cause is that QoS updating is not supported by the network node; the path switch request acknowledgement message is an NG-RAN application protocol (NGAP) message; the HO procedure is an Xn HO; and/or the HO procedure comprises a HO of the WD from a first radio access network to a second radio access network.

In some embodiments, the method further includes one or more of: sending, such as via notification unit 32, processing circuitry 68, processor 70 and/or radio interface 62, a path switch request message to a core network node, the received path switch request acknowledgement message being a response to the path switch request message and the path switch request message representing a request to HO the WD from a first radio access network to a second radio access network; and/or including, such as via notification unit 32, processing circuitry 68, processor 70 and/or radio interface 62, in the notification, information about a QoS parameter value that the network node is able to fulfill.

FIG. 8 is a flowchart of an example process in a network node 16 (e.g., mobility management node, such as AMF) according to some embodiments of the present disclosure. One or more Blocks and/or functions and/or methods performed by the network node 16 may be performed by one or more elements of network node 16 such as by HO unit 34 in processing circuitry 68, processor 70, radio interface 62, etc. according to the example method. The example method includes during a handover (HO) procedure associated with a wireless device (WD), sending (Block S138), such as via HO unit 34, processing circuitry 68, processor 70 and/or radio interface 62, a path switch request acknowledgement message comprising at least one first Quality-of-Service (QoS) parameter value associated with the WD. The method includes as a result of the sent path switch request acknowledgement message comprising the at least one first QoS parameter value, receiving (Block S140), such as via HO unit 34, processing circuitry 68, processor 70 and/or radio interface 62, a notification, the notification indicating at least one of: that the at least one first QoS parameter value is not fulfilled, that QoS parameter updating is not supported, that QoS parameter updating failed and a release of a QoS flow.

In some embodiments, one or more of: the notification is received from a second network node; the second network node comprises a radio access network (RAN) node; the RAN node is not configured to support QoS parameter updating during HO; the at least one first QoS parameter value is different from a second QoS parameter value stored at the second network node before sending the message comprising the at least one first QoS parameter value; the at least one first QoS parameter value represents an updated QoS parameter value; the first and second QoS parameter values corresponding to a same PDU session; the at least one first and second QoS parameter values are core network (CN) packet delay budget (PDB) parameter values; the network node is a core network node and/or includes an access and mobility management (AMF) function; the notification is comprised in a protocol data unit, PDU, session resource notify message; the notification is received from a radio access network (RAN) node; the QoS parameter comprises a core network (CN) packet delay budget (PDB) parameter; the notification further comprises information indicating a cause for the notification; the cause is that QoS updating is not supported by the second network node; the path switch request acknowledgement message is an NG-RAN application protocol (NGAP) message; the HO procedure is an Xn HO; and/or the HO procedure comprises a HO of the WD from a first radio access network to a second radio access network.

In some embodiments, the method further includes one or more of: receiving, such as via HO unit 34, processing circuitry 68, processor 70 and/or radio interface 62, a path switch request message from a second network node, the sent path switch request acknowledgement message being a response to the path switch request message and the path switch request message representing a request from the second network to HO the WD from a first radio access network to a second radio access network; and/or receiving the notification further comprises receiving, such as via HO unit 34, processing circuitry 68, processor 70 and/or radio interface 62, in the notification, information about a QoS parameter value that the second network node is able to fulfill.

FIG. 9 is a flowchart of an example process in a network node 16 (e.g., RAN node/base station node) according to some embodiments of the present disclosure. One or more Blocks and/or functions and/or methods performed by the network node 16 may be performed by one or more elements of network node 16 such as by notification unit 32 in processing circuitry 68, processor 70, memory 72, communication interface 60, radio interface 62, etc. according to the example method. The example method includes during a handover, HO, procedure associated with a wireless device, WD, receiving (Block S142), such as by notification unit 32 in processing circuitry 68, processor 70, communication interface 60 and/or radio interface 62, a path switch request acknowledgement message comprising at least one first Quality-of-Service, QoS, parameter value associated with the WD. The method includes as a result of the received path switch request acknowledgement message comprising the at least one first QoS parameter value, using (Block S144), such as by notification unit 32 in processing circuitry 68, processor 70, communication interface 60 and/or radio interface 62, at least one second QoS parameter value associated with the WD and sending a notification, the notification indicating at least one of: that the at least one first QoS parameter value is not fulfilled, that a QoS parameter updating is not supported by the network node and that the QoS parameter updating failed.

In some embodiments, the at least one first QoS parameter value represents an updated QoS parameter value associated with the WD. In some embodiments, the at least one first and second QoS parameter values are core network, CN, packet delay budget, PDB, parameter values. In some embodiments, the notification is comprised in a protocol data unit, PDU, session resource notify message. In some embodiments, the second QoS parameter value is stored at the network node for the WD, before the receiving the path switch request acknowledgement message comprising the at least one first QoS parameter value. In some embodiments, the notification indicates the at least one third QoS parameter value and the at least one third QoS parameter value comprises at least one QoS parameter value that the network node is able to fulfill.

In some embodiments, the notification comprises the at least one third QoS parameter value and the at least one third QoS parameter value comprises at least one proposed CN PDB parameter value. In some embodiments, the notification further comprises information indicating a cause for the notification. In some embodiments, the cause indicated in the notification includes at least one of: that the at least one first QoS parameter value is not fulfilled, that the QoS updating is not supported by the network node and that the QoS parameter updating failed.

In some embodiments, the method includes sending, such as by notification unit 32 in processing circuitry 68, processor 70, communication interface 60 and/or radio interface 62, a path switch request message to a core network node, the received path switch request acknowledgement message being a response from the core network node to the path switch request message and the path switch request message representing a request to HO the WD from a first radio access network to a second radio access network. In some embodiments, the network node comprises a radio access network, RAN, node and the core network node comprises an access and mobility management, AMF, function.

FIG. 10 is a flowchart of an example process in a network node 16 (e.g., mobility management node, such as AMF) according to some embodiments of the present disclosure. One or more Blocks and/or functions and/or methods performed by the network node 16 may be performed by one or more elements of network node 16 such as by HO unit 34 in processing circuitry 68, processor 70, memory 72, communication interface 60, radio interface 62, etc. according to the example method. The example method includes during a handover, HO, procedure associated with a wireless device, WD, sending (Block S146), such as by HO unit 34 in processing circuitry 68, processor 70, memory 72, communication interface 60, radio interface 62, to a second network node, a path switch request acknowledgement message comprising at least one first Quality-of-Service, QoS, parameter value associated with the WD. The method includes as a result of the sent path switch request acknowledgement message comprising the at least one first QoS parameter value, receiving (Block S148), such as by HO unit 34 in processing circuitry 68, processor 70, memory 72, communication interface 60 and/or radio interface 62, from the second network node, a notification, the notification indicating at least one of: that the at least one first QoS parameter value is not fulfilled, that a QoS parameter updating is not supported by the second network node and that the QoS parameter updating failed. The method includes as a result of the notification, determining (Block S150), such as by HO unit 34 in processing circuitry 68, processor 70, memory 72, communication interface 60 and/or radio interface 62, that the second network node is using at least one second QoS parameter value, the at least one second QoS parameter value being different from the at least one first QoS parameter value.

In some embodiments, the at least one first QoS parameter value represents an updated QoS parameter value associated with the WD. In some embodiments, the at least one first and second QoS parameter values are core network, CN, packet delay budget, PDB, parameter values. In some embodiments, the notification is comprised in a protocol data unit, PDU, session resource notify message. In some embodiments, the second QoS parameter value is stored at the second network node for the WD, before the sending the path switch request acknowledgement message comprising the at least one first QoS parameter value. In some embodiments, the notification indicates the at least one third QoS parameter value and the at least one third QoS parameter value comprises at least one QoS parameter value that the second network node is able to fulfill.

In some embodiments, the notification comprises the at least one third QoS parameter value and the at least one third QoS parameter value comprises at least one proposed CN PDB parameter value. In some embodiments, the notification further comprises information indicating a cause for the notification. In some embodiments, the cause indicated in the notification includes at least one of: that the at least one first QoS parameter value is not fulfilled, that the QoS updating is not supported by the network node and that the QoS parameter updating failed.

In some embodiments, the method further includes receiving, such as by HO unit 34 in processing circuitry 68, processor 70, memory 72, communication interface 60 and/or radio interface 62, a path switch request message from the second network node, the sent path switch request acknowledgement message being a response to the radio access network node to the path switch request message and the path switch request message representing a request to HO the WD from a first radio access network to a second radio access network supported by the second network node. In some embodiments, the second network node comprises a radio access network, RAN, node and the network node comprises an access and mobility management, AMF, function.

Having described the general process flow of arrangements of the disclosure and having provided examples of hardware and software arrangements for implementing the processes and functions of the disclosure, the sections below provide details and examples of arrangements for handling Quality-of-Service (QoS) updating during handover (HO), which may be implemented by the network node 16 (e.g., RAN node and/or AMF node), wireless device 22 and/or host computer 24.

In some embodiments, when the QoS is updated in the Xn Handover procedure but the NG-RAN node (e.g., NN 16c) does not support the function, for example because there is no response message back to the CN (e.g., NN 16d), the consequence may be handled as described herein. Some embodiments may include specifying that the NG-RAN node (e.g., NN 16c) continues to use the old/previous QoS value that was previously received and stored before the QoS updating during the handover.

In some embodiments, the NG-RAN node (e.g., NN 16c) notifies the CN (e.g., NN 16d) that CN PDU or PDB updating is not supported via, e.g., Notify procedures, by indicating the QoS is not fulfilled, or a new failure cause value which may be defined to indicate that the root cause of the problem is due to, e.g., CN PDB updating not being supported/failed. The NG-RAN node (e.g., NN 16c) may provide the proposed CN PDB value it can fulfill to the CN (e.g., NN 16d).

In some embodiments, the CN (e.g., NN 16d) may be configured to determine, e.g., to perform a QoS modification procedure to determine a suitable setting, as a result of having received the indication/notification (e.g., in a PDU Session Resource Notify message). Alternatively, the NG-RAN node (e.g., NN 16c) may issue the release of the QoS flows.

Although some examples of the present disclosure are described for PDB updating, some embodiments may be extended to other QoS related parameters. In some embodiments, an additional cause (as shown for example in Table 1 below) may be extended to indicate the exact reason that NG-RAN node (e.g., NN 16c) is notifying the CN (e.g., NN 16d).

Path Switch Request

Abnormal Conditions

In some embodiments, if the AMF (e.g., NN 16d, or some other network node) receives a PATH SWITCH REQUEST message containing several PDU Session identification (ID) Information Elements (IEs) (e.g., in the PDU Session Resource to be Switched in Downlink List IE) set to the same value, the AMF (e.g., NN 16c) may send the PATH SWITCH REQUEST FAILURE message to the NG-RAN node.

NOTE: As an exception, the AMF (e.g., NN 16d) may generate a Path Switch Request Unsuccessful Transfer IE.

In some embodiments of the present disclosure, if the NG-RAN node (e.g., NN 16c) receives a PATH SWITCH REQUEST ACKNOWLEDGE message containing CN PDB IEs for the QoS flow in the PDU Session but the NG-RAN node (e.g., NN 16c) does not support the updating, the NG-RAN node (e.g., NN 16c) will continue to use the earlier stored value. In some embodiments, the NG-RAN node (e.g., NN 16c) may be configured to specify to the CN (e.g., NN 16d) failure handling in a Path Switch Request procedure in NGAP.

PDU Session Resource Notify Transfer

This IE may be transparent to the AMF.

TABLE 1

Example of specifying a cause as, e.g., the CN PDB updating not being supported in NGAP.

| IE/Group Name | Presence | Range | IE type and reference | Semantics description | Criticality | Assigned Criticality |
|---|---|---|---|---|---|---|
| QoS Flow Notify List | | 0 . . . 1 | | | — | |
| >QoS Flow Notify Item | | 1 . . . <maxnoofQoSFlows> | | | — | |
| >>QoS Flow Identifier | M | | 9.3.1.51 | | — | |
| >>Notification Cause | M | | ENUMERATED (fulfilled, not fulfilled, . . .) | | — | |
| >>Current QoS Parameters Set Index | O | | Alternative QoS Parameters Set Notify Index 9.3.1.153 | Index to the currently fulfilled alternative QoS parameters set. Value 0 indicates that NG-RAN cannot even fulfil the lowest alternative parameters set. | YES | Ignore |
| >>Additional Cause | O | | Define the new causes, e.g., CN PDB updating not supported | Indicating the additional cause when the Notification Cause is "not fulfilled" | YES | Ignore |
| QoS Flow Released List | O | | QoS Flow List with Cause 9.3.1.13 | | — | |
| Secondary RAT Usage Information | O | | 9.3.1.114 | | YES | ignore |

21

22

Some embodiments may include one or more of the following:

Embodiment A1. A network node configured to communicate with a wireless device (WD), the network node configured to, and/or comprising a radio interface and/or comprising processing circuitry configured to:

during a handover (HO) procedure associated with the WD, receive a path switch request acknowledgement message comprising at least one first Quality-of-Service (QoS) parameter value associated with the WD; and as a result of the received path switch request acknowledgement message comprising the at least one first QoS parameter value, use at least one second QoS parameter value associated with the WD and/or send a notification, the notification indicating at least one of: that the at least one first QoS parameter value is not fulfilled, that QoS parameter updating is not supported, that QoS parameter updating failed and a release of a QoS flow.

Embodiment A2. The network node of Embodiment A1, wherein one or more of:

the second QoS parameter value is different from the first QoS parameter value;

the second QoS parameter value is stored at the network node before receiving the message comprising the at least one first QoS parameter value;

the at least one first QoS parameter value represents an updated QoS parameter value;

the network node comprises a radio access network (RAN) node;

the RAN node is not configured to support QoS parameter updating during HO;

the at least one first and second QoS parameter values are core network (CN) packet delay budget (PDB) parameter values;

the notification is comprised in a protocol data unit, PDU, session resource notify message;

the notification is sent to a core network node;

the core network node comprises an access and mobility management (AMF) function;

the notification further comprises information indicating a cause for the notification;

the cause is that QoS updating is not supported by the network node;

the path switch request acknowledgement message is an NG-RAN application protocol (NGAP) message;

the HO procedure is an Xn HO; and/or the HO procedure comprises a HO of the WD from a first radio access network to a second radio access network.

Embodiment A3. The network node of any one of Embodiments A1 and A2, wherein the network node and/or radio interface and/or processing circuitry is further configured to cause the network node to one or more of:

send a path switch request message to a core network node, the received path switch request acknowledgement message being a response to the path switch request message and the path switch request message representing a request to HO the WD from a first radio access network to a second radio access network; and/or include, in the notification, information about a QoS parameter value that the network node is able to fulfill.

Embodiment B1. A method implemented in a network node, the method comprising:

during a handover (HO) procedure associated with the WD, receiving a path switch request acknowledgement message comprising at least one first Quality-of-Service (QoS) parameter value associated with the WD; and as a result of the received path switch request acknowledgement message comprising the at least one first QoS parameter value, using at least one second QoS parameter value associated with the WD and/or sending a notification, the notification indicating at least one of: that the at least one first QoS parameter value is not fulfilled, that QoS parameter updating is not supported, that QoS parameter updating failed and a release of a QoS flow.

Embodiment B2. The method of Embodiment B 1, wherein one or more of:

the second QoS parameter value is different from the first QoS parameter value;

the second QoS parameter value is stored at the network node before receiving the message comprising the at least one first QoS parameter value;

the at least one first QoS parameter value represents an updated QoS parameter value;

the network node comprises a radio access network (RAN) node;

the RAN node is not configured to support QoS parameter updating during HO;

the at least one first and second QoS parameter values are core network (CN) packet delay budget (PDB) parameter values;

the notification is comprised in a protocol data unit, PDU, session resource notify message;

the notification is sent to a core network node;

the core network node comprises an access and mobility management (AMF) function;

the notification further comprises information indicating a cause for the notification;

the cause is that QoS updating is not supported by the network node;

the path switch request acknowledgement message is an NG-RAN application protocol (NGAP) message;

the HO procedure is an Xn HO; and/or the HO procedure comprises a HO of the WD from a first radio access network to a second radio access network.

Embodiment B3. The method of any one of Embodiments B1 and B2, further comprising one or more of:

sending a path switch request message to a core network node, the received path switch request acknowledgement message being a response to the path switch request message and the path switch request message representing a request to HO the WD from a first radio access network to a second radio access network; and/or including, in the notification, information about a QoS parameter value that the network node is able to fulfill.

Embodiment C1. A network node, the network node configured to, and/or comprising a radio interface and/or processing circuitry configured to:

during a handover (HO) procedure associated with a wireless device (WD), send a path switch request acknowledgement message comprising at least one first Quality-of-Service (QoS) parameter value associated with the WD; and as a result of the sent path switch request acknowledgement message comprising the at least one first QoS parameter value, receive a notification, the notification indicating at least one of: that the at least one first QoS parameter value is not fulfilled, that QoS parameter updating is not supported, that QoS parameter updating failed and a release of a QoS flow.

Embodiment C2. The network of Embodiment C1, wherein one or more of:

the notification is received from a second network node;

the second network node comprises a radio access network (RAN) node;

the RAN node is not configured to support QoS parameter updating during HO;

the at least one first QoS parameter value is different from a second QoS parameter value stored at the second network node before sending the message comprising the at least one first QoS parameter value;

the at least one first QoS parameter value represents an updated QoS parameter value;

the first and second QoS parameter values corresponding to a same PDU session;

the at least one first and second QoS parameter values are core network (CN) packet delay budget (PDB) parameter values;

the network node is a core network node and/or includes an access and mobility management (AMF) function;

the notification is comprised in a protocol data unit, PDU, session resource notify message;

the notification is received from a radio access network (RAN) node;

the QoS parameter comprises a core network (CN) packet delay budget (PDB) parameter;

the notification further comprises information indicating a cause for the notification;

the cause is that QoS updating is not supported by the second network node;

the path switch request acknowledgement message is an NG-RAN application protocol (NGAP) message;

the HO procedure is an Xn HO; and/or the HO procedure comprises a HO of the WD from a first radio access network to a second radio access network.

Embodiment C3. The network node of any one of Embodiments C1 and C2, wherein the network node and/or radio interface and/or processing circuitry is further configured to cause the network node to one or more of:

receive a path switch request message from a second network node, the sent path switch request acknowledgement message being a response to the path switch request message and the path switch request message representing a request from the second network to HO the WD from a first radio access network to a second radio access network; and/or receive the notification by being configured to receive, in the notification, information about a QoS parameter value that the second network node is able to fulfill.

Embodiment D1. A method implemented in a network node, the method comprising:

during a handover (HO) procedure associated with a wireless device (WD), sending a path switch request acknowledgement message comprising at least one first Quality-of-Service (QoS) parameter value associated with the WD; and as a result of the sent path switch request acknowledgement message comprising the at least one first QoS parameter value, receiving a notification, the notification indicating at least one of: that the at least one first QoS parameter value is not fulfilled, that QoS parameter updating is not supported, that QoS parameter updating failed and a release of a QoS flow.

Embodiment D2. The method of Embodiment D1, wherein one or more of:

the notification is received from a second network node;

the second network node comprises a radio access network (RAN) node;

the RAN node is not configured to support QoS parameter updating during HO;

the at least one first QoS parameter value is different from a second QoS parameter value stored at the second network node before sending the message comprising the at least one first QoS parameter value;

the at least one first QoS parameter value represents an updated QoS parameter value;

the first and second QoS parameter values corresponding to a same PDU session;

the at least one first and second QoS parameter values are core network (CN) packet delay budget (PDB) parameter values;

the network node is a core network node and/or includes an access and mobility management (AMF) function;

the notification is comprised in a protocol data unit, PDU, session resource notify message;

the notification is received from a radio access network (RAN) node;

the QoS parameter comprises a core network (CN) packet delay budget (PDB) parameter;

the notification further comprises information indicating a cause for the notification;

the cause is that QoS updating is not supported by the second network node;

the path switch request acknowledgement message is an NG-RAN application protocol (NGAP) message;

the HO procedure is an Xn HO; and/or the HO procedure comprises a HO of the WD from a first radio access network to a second radio access network.

Embodiment D3. The method of any one of Embodiments D1 and D2, further comprising one or more of:

receiving a path switch request message from a second network node, the sent path switch request acknowledgement message being a response to the path switch request message and the path switch request message representing a request from the second network to HO the WD from a first radio access network to a second radio access network; and/or receiving the notification further comprises receiving, in the notification, information about a QoS parameter value that the second network node is able to fulfill.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a radio access network node, the method comprising:

during a handover, HO, procedure associated with a wireless device, WD, receiving from a core network node, a path switch request acknowledgement message comprising at least one first Quality-of-Service, QoS, parameter value associated with the WD; and as a result of the received path switch request acknowledgement message comprising the at least one first QoS parameter value, using at least one second QoS parameter value associated with the WD and sending to the core network node, a notification, the notification indicating at least one of: that the at least one first QoS parameter value is not fulfilled, that a QoS parameter updating is not supported by the network node and that the QoS parameter updating failed.

2. The method of claim 1, wherein the at least one first QoS parameter value represents an updated QoS parameter value associated with the WD.

3. The method of claim 1, wherein the at least one first and second QoS parameter values are core network, CN, packet delay budget, PDB, parameter values.

4. The method of claim 1, wherein the notification is comprised in a protocol data unit, PDU, session resource notify message.

5. The method of claim 1, wherein the second QoS parameter value is stored at the radio access network node for the WD, before the receiving the path switch request acknowledgement message comprising the at least one first QoS parameter value.

6. The method of claim 1, wherein the notification indicates the at least one third QoS parameter value and the at least one third QoS parameter value comprises at least one QoS parameter value that the network node is able to fulfill.

7. The method of claim 1, wherein the notification comprises the at least one third QoS parameter value and the at least one third QoS parameter value comprises at least one proposed CN PDB parameter value.

8. The method of claim 1, wherein the notification further comprises information indicating a cause for the notification.

9. The method of claim 8, wherein the cause indicated in the notification includes at least one of: that the at least one first QoS parameter value is not fulfilled, that the QoS updating is not supported by the radio access network node and that the QoS parameter updating failed.

10. The method of claim 1, further comprising:

sending a path switch request message to a core network node, the received path switch request acknowledgement message being a response from the core network node to the path switch request message and the path switch request message representing a request to HO the WD from a first radio access network to a second radio access network.

11. The method of claim 10, wherein the core network node comprises an access and mobility management, AMF, function.

12. A radio access network node comprising processing circuitry, the processing circuitry being configured to cause the radio access network node to:

during a handover, HO, procedure associated with a wireless device, WD, receive from a core network node, a path switch request acknowledgement message comprising at least one first Quality-of-Service, QoS, parameter value associated with the WD; and as a result of the received path switch request acknowledgement message comprising the at least one first QoS parameter value, use at least one second QoS parameter value associated with the WD and send to the core network node, a notification, the notification indicating at least one of: that the at least one first QoS parameter value is not fulfilled, that a QoS parameter updating is not supported by the network node and that the QoS parameter updating failed.

13. The radio access network node of claim 12, wherein the at least one first QoS parameter value represents an updated QoS parameter value associated with the WD.

14. The radio access network node of claim 12, wherein the at least one first and second QoS parameter values are core network, CN, packet delay budget, PDB, parameter values.

15. The radio access network node of claim 12, wherein the notification is comprised in a protocol data unit, PDU, session resource notify message.

16. The radio access network node of claim 12, wherein the second QoS parameter value is stored at the radio access network node for the WD, before the receiving the path switch request acknowledgement message comprising the at least one first QoS parameter value.

17. The radio access network node of claim 12, wherein the notification indicates the at least one third QoS parameter value and the at least one third QoS parameter value comprises at least one QoS parameter value that the network node is able to fulfill.

18. The radio access network node of claim 12, wherein the notification comprises the at least one third QoS parameter value and the at least one third QoS parameter value comprises at least one proposed CN PDB parameter value.

19. The radio access network node of claim 12, wherein the notification further comprises information indicating a cause for the notification.

20. The radio access network node of claim 19, wherein the cause indicated in the notification includes at least one of: that the at least one first QoS parameter value is not fulfilled, that the QoS updating is not supported by the radio access network node and that the QoS parameter updating failed.

21. The radio access network node of claim 12, wherein the processing circuitry is configured to cause the radio access network node to:

send a path switch request message to the core network node, the received path switch request acknowledgement message being a response from the core network node to the path switch request message and the path switch request message representing a request to HO the WD from a first radio access network to a second radio access network.

* * * * *